United States Patent
Park et al.

(10) Patent No.: US 9,178,662 B2
(45) Date of Patent: Nov. 3, 2015

(54) RANDOM ACCESS METHOD USING NDI AND USER EQUIPMENT FOR THE SAME

(75) Inventors: Sung Jun Park, Anyang-si (KR); Seung June Yi, Anyang-si (KR); Sung Duck Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 13/148,285

(22) PCT Filed: Feb. 3, 2010

(86) PCT No.: PCT/KR2010/000657
§ 371 (c)(1),
(2), (4) Date: Aug. 31, 2011

(87) PCT Pub. No.: WO2010/090440
PCT Pub. Date: Aug. 12, 2010

(65) Prior Publication Data
US 2011/0305197 A1 Dec. 15, 2011

Related U.S. Application Data

(60) Provisional application No. 61/150,719, filed on Feb. 6, 2009.

(30) Foreign Application Priority Data

Jan. 19, 2010 (KR) .................. 10-2010-0004692

(51) Int. Cl.
| | |
|---|---|
| *H04W 74/08* | (2009.01) |
| *H04L 1/18* | (2006.01) |
| *H04W 24/00* | (2009.01) |
| *H04W 72/12* | (2009.01) |
| *H04W 72/04* | (2009.01) |
| *H04W 8/26* | (2009.01) |
| *H04W 74/00* | (2009.01) |

(52) U.S. Cl.
CPC ............ *H04L 1/1812* (2013.01); *H04L 1/1822* (2013.01); *H04L 1/1896* (2013.01); *H04W 8/26* (2013.01); *H04W 24/00* (2013.01); *H04W 72/04* (2013.01); *H04W 72/12* (2013.01); *H04W 74/002* (2013.01); *H04W 74/0833* (2013.01)

(58) Field of Classification Search
CPC ... H04L 1/1812; H04L 1/1822; H04L 1/1896; H04W 74/002; H04W 74/0833
USPC .................. 370/328–338; 455/450
See application file for complete search history.

(56) References Cited

U.S. PATENT DOCUMENTS

| | | | |
|---|---|---|---|
| 2002/0071480 A1 | 6/2002 | Marjelund et al. | |
| 2008/0101313 A1 | 5/2008 | Choi et al. | |
| 2008/0273610 A1 | 11/2008 | Malladi et al. | |
| 2010/0034162 A1* | 2/2010 | Ou et al. ........................ | 370/329 |
| 2010/0074204 A1* | 3/2010 | Meylan ......................... | 370/329 |
| 2010/0111067 A1* | 5/2010 | Wu ............................... | 370/345 |
| 2011/0182245 A1* | 7/2011 | Malkamaki et al. .......... | 370/329 |

\* cited by examiner

*Primary Examiner* — Jae Y Lee
*Assistant Examiner* — Jean F Voltaire
(74) *Attorney, Agent, or Firm* — Lee, Hong, Degerman, Kang & Waimey

(57) ABSTRACT

A random access method for preventing unnecessary uplink (UL) signal transmission using a New Data Indicator (NDI) and a user equipment for the same are disclosed. In the random access procedure, in order to prevent unnecessary transmission when a user equipment erroneously recognizes a UL grant signal transmitted using a cell identifier (C-RNTI) of another user equipment as a UL grant signal transmitted using its temporary cell identifier (temporary C-RNTI), toggling of an NDI indicating whether new data is transmitted may be used in a Hybrid Automatic Repeat reQuest (HARQ) system. In addition, determination as to whether or not the UL grant signal received during the random access procedure is different from that of a HARQ process used for transmission of a third message (Msg3) may be used.

18 Claims, 9 Drawing Sheets

RANDOM ACCESS METHOD USING NDI AND USER EQUIPMENT FOR THE SAME

CROSS-REFERENCE TO RELATED APPLICATIONS

This application is the National Stage filing under 35 U.S.C. 371 of International Application No. PCT/KR2010/000657, filed on Feb. 3, 2010, which claims the benefit of earlier filing date and right of priority to Korean Application No. 10-2010-0004692, filed on Jan. 19, 2010, and also claims the benefit of U.S. Provisional Application Ser. No. 61/150,719, filed on Feb. 6, 2009, the contents of all of which are incorporated by reference herein in their entireties.

BACKGROUND OF THE INVENTION

1. Field of the Invention

The present invention relates to a random access method for preventing unnecessary uplink signal transmission using a New Data Indicator (NDI) and a user equipment for the same.

2. Discussion of the Related Art

As an example of a mobile communication system to which the present invention is applicable, a $3^{rd}$ Generation Partnership Project Long Term Evolution (3GPP LTE) communication system will be schematically described.

FIG. 1 is a schematic diagram of an Evolved Universal Mobile Telecommunications System (E-UMTS) network architecture as an example of a mobile communication system.

The E-UMTS is an evolved version of the existing UMTS and basic standardization thereof is in progress under the 3GPP. The E-UMTS is also referred to as a Long Term Evolution (LTE) system.

The E-UMTS network may be roughly divided into an Evolved UMTS Terrestrial Radio Access Network (E-UTRAN) 101 and a Core Network (CN) 102. The E-UTRAN 101 generally comprises a terminal (i.e., User Equipment (UE)) 103, a base station (i.e., eNode B or eNB) 104, an Access Gateway (AG) 105 that is located at an end of the E-UMTS network and connects with one or more external networks. The AG 105 may be divided into a part for processing user traffic and a part for handling control traffic. Here, an AG for processing new user traffic and an AG for processing control traffic can communicate with each other using a new interface.

One eNode B may have one or more cells. An interface for transmitting the user traffic or the control traffic may be used among the eNode Bs. The CN 102 may comprise an AG 105, nodes for user registration of other UEs 103, and the like. An interface may be used to distinguish the E-UTRAN 101 and the CN 102 from each other.

The various layers of the radio interface protocol between the terminal and the network may be divided into Layer 1 (L1), Layer 2 (L2) and Layer 3 (L3), based upon the lower three layers of the Open System Interconnection (OSI) standard model that is well-known in the field of communications systems. Among these layers, Layer 1 (L1), namely, the physical layer, provides an information transfer service by using a physical channel, while a Radio Resource Control (RRC) layer located in Layer 3 (L3) performs the function of controlling radio resources between the terminal and the network. The RRC layer exchanges RRC messages between the terminal and the network. The RRC layer may be located by being distributed in network nodes such as the eNode B 104, the AG 105, and the like, or may be located only in the eNode B 104 or the AG 105.

FIGS. 2 and 3 show an architecture of a radio interface protocol between a terminal and a UTRAN according to the 3GPP radio access network standard.

The radio interface protocol shown in FIGS. 2 and 3 is horizontally composed of a physical layer, a data link layer, and a network layer, and is vertically composed of a user plane for transmitting user data and a control plane for transferring control signaling. In detail, FIG. 2 shows the layers of the radio protocol control plane and FIG. 3 shows the layers of the radio protocol user plane. The protocol layers of FIGS. 2 and 3 may be divided into L1 (Layer 1), L2 (Layer 2), and L3 (Layer 3) based upon the lower three layers of the Open System Interconnection (OSI) standard model that is widely known in the field of communication systems.

Hereinafter, particular layers of the radio protocol control plane of FIG. 2 and the radio protocol user plane of FIG. 3 will be described.

The physical layer (PHY) (Layer 1) provides an information transfer service to an upper layer using a physical channel. The PHY layer is connected to a Medium Access Control (MAC) layer located thereabove via a transport channel, and data is transferred between the PHY layer and the MAC layer via the transport channel. At this time, the transfer channel is roughly divided into a dedicated transfer channel and a common transfer channel depending on whether or not a channel is shared. In addition, data is transferred respectively between different physical layers, namely, between the respective physical layers of the transmitting side and the receiving side via a physical channel using radio resources.

Various layers are located in Layer 2. First, the Medium Access Control (MAC) layer maps various logical channels to various transfer channels and performs a logical channel multiplexing function for mapping various logical channels to one transfer channel. The MAC layer is connected to a Radio Link Control (RLC) layer which is an upper layer via a logical channel, and the logical channel may be roughly divided into a control channel for transmitting information about the control plane and a traffic channel for transmitting information about the user plane, according to the type of transmitted information.

The RLC layer of the second layer segments and concatenates data received from an upper layer, thereby controlling a data size so as to be suitable for a lower layer to transmit data to a radio interval. The RLC provides three modes, namely, a transparent mode (TM), an unacknowledged mode (UM) and an acknowledged Mode (AM) to support various QoSs requested by each radio bearer (RB). Especially, for reliable data transmission, the AM RLC performs a function to retransmit data through an automatic repeat request (ARQ).

A packet data convergence protocol (PDCP) layer located at the second layer is used to efficiently transmit IP packets, such as IPv4 or IPv6, on a radio interval with a relatively narrow bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interval. In the LTE system, the PDCP layer also performs a security function. The security function includes a ciphering function for preventing data monitoring from a third party, and an integrity protection function for preventing data manipulation from a third party.

A radio resource control (RRC) layer located at a highest portion of the third layer is defined in the control plane. The RRC layer handles logical channels, transport channels and physical channels for the configuration, re-configuration and release of radio bearers. Here, a radio bearer (RB) denotes a logical path provided by the first and second layers of radio protocols for data transfer between the terminal and the UTRAN. Generally, configuration of the RB indicates a process of regulating radio protocol layers and channel characteristics necessary for providing a specific service, and configuring specific parameters and operation methods. The RB is divided into a signaling RB (SRB) and data RB (DRB). The SRB is used as a path through which an RRC message is transmitted on a C-plane, while the DRB is used as a path through which user data is transmitted on a U-plane.

Downlink transport channels for transmitting data from a network to a terminal may include a Broadcast Channel (BCH) for transmitting system information and a downlink Shared Channel (SCH) for transmitting other user traffic or control messages. Traffic or control messages of a downlink multicast or broadcast service may be transmitted either via a downlink SCH, or via a separate downlink Multicast Channel (MCH). In addition, uplink transport channels for transmitting data from a terminal to a network may include a Random Access Channel (RACH) for transmitting an initial control message and an uplink Shared Channel (SCH) for transmitting user traffic or control messages.

Downlink physical channels for transmitting information transferred to a downlink transport channel via a radio interval between a network and a terminal may include a Physical Broadcast Channel (PBCH) for transmitting BCH information, a Physical Multicast Channel (PMCH) for transmitting MCH information, a Physical Downlink Shared Channel (PDSCH) for transmitting PCH information and downlink SCH information, and a Physical Downlink Control Channel (PDCCH) (also called a DL L1/L2 control channel) for transmitting control information sent from the first and second layers, such as downlink or uplink radio resource allocation information (DL/UL Scheduling Grant) or the like. Uplink physical channels for transmitting information transferred to an uplink transport channel via a radio interval between a network and a terminal may include a Physical Uplink Shared Channel (PUSCH) for transmitting uplink SCH information, a Physical Random Access Channel (PRACH) for transmitting RACH information, and a Physical Uplink Control Channel (PUCCH) for transmitting control information sent from the first and second layers, such as HARQ ACK or NACK, Scheduling Request (SR), Channel Quality Indicator (CQI) report and the like.

The HARQ operation performed in the LTE system based on the above description will now be described.

FIG. 4 is a diagram showing a HARQ operation performed in the LTE system.

In FIG. 4, description will be given in an uplink state in which a UE is a transmission side, a base station (eNode B or eNB) is a reception side, and HARQ feedback information is received from the base station, but may be equally applied to downlink transmission.

First, the eNB may transmit uplink scheduling information, that is, uplink grant (UL grant), via a Physical Downlink Control channel (PDCCH), in order to enable the UE to transmit data using the HARQ scheme (S401). The UL grant may include a UE identifier (e.g., C-RNTI, semi-persistent scheduling C-RNTI), a location of an assigned radio resource (resource block assignment), a transmission parameter such as a modulation/coding rate, a redundancy version and the like, a new data indicator (NDI), etc.

The UE may check UL grant information sent to itself by monitoring a PDCCH in each Transmission Time Interval (TTI). In case of discovering the UL grant information sent to itself, the UE may transmit data (data 1 in FIG. 4) via a physical uplink shared channel (PUSCH) according to the received UL grant information (S402). In this case, the transmitted data can be transmitted by a MAC Protocol Data Unit (PDU).

As described above, after the UE has performed the uplink transmission via the PUSCH, the UE waits for reception of HARQ feedback information via a Physical Hybrid-ARQ Indicator Channel (PHICH) from the eNB. If HARQ NACK for the data 1 is transmitted from the eNB (S403), the UE retransmits the data 1 in a retransmission TTI of the data 1 (S404). On the contrary, if HARQ ACK is received from the eNB (not shown), the UE stops the HARQ retransmission of the data 1.

Each time the UE performs one data transmission using the HARQ scheme, the UE takes a count of the number of transmissions (CURRENT_TX_NB). If the transmission number reaches a maximum transmission number (CURRENT_TX_NB) set by an upper layer, the UE discards the MAC PDU stored in a HARQ buffer.

If the HARQ ACK for the data 1 retransmitted in the step S404 from the UE is received (S405) and if a UL grant is received via the PDCCH (S406), the UE may determine whether data to be transmitted this time is an initially-transmitted MAC PDU or whether to retransmit a previous MAC PDU using a new data indicator (NDI) field received via the PDCCH. In this case, the NDI field is a 1-bit field. The NDI field is toggled as $0 \rightarrow 1 \rightarrow 0 \rightarrow 1 \rightarrow \ldots$ each time a new MAC PDU is transmitted. For the retransmission, the NDI field is set to a value equal to that of the initial transmission. In particular, the UE may determine whether to retransmit the MAC PDU, by comparing the NDI field with a previously transmitted value.

In case of FIG. 4, as a value of NDI=0 in the step S401 is toggled into NDI=1 in the step S406, the UE recognizes that the corresponding transmission is a new transmission. The UE may transmit data 2 via a PUSCH (S407).

Meanwhile, a procedure of, at a UE, performing random access to an eNB will now be described.

First, the UE may perform a random access procedure in the following cases:
 when the UE performs initial access because there is no RRC Connection with the eNB,
 when the UE initially accesses a target cell in a handover procedure,
 when the random access procedure is requested by a command of a base station,
 when there is uplink data transmission in a situation where uplink time synchronization is not aligned or where a specific radio resource used for requesting radio resources is not allocated, and
 when a recovery procedure is performed in case of a radio link failure or a handover failure.

In the LTE system, there are two procedures in selecting a random access preamble: one is a contention based random access procedure in which the UE randomly selects one preamble within a specific group for use, another is a non-contention based random access procedure in which the UE uses a random access preamble allocated only to a specific UE by the eNB. The non-contention based random access procedure may be used, as described above, only in the handover procedure or when it is requested by the command of the eNB.

Meanwhile, a procedure in which a UE performs random access to a specific eNB may include steps of (1) at the UE, transmitting a random access preamble to the eNB (hereinafter, referred to as a "first message (Message 1)" transmission step), (2) receiving a random access response from the eNB in correspondence with the transmitted random access preamble (hereinafter, referred to as a "second message (Message 2)" reception step), (3) transmitting an uplink message using information received by the random access response message (hereinafter, referred to as a "third message (Message 3)" transmission step), and (4) receiving a message corresponding to the uplink message from the eNB (hereinafter, referred to as a "fourth message (Message 4)" reception step).

FIG. 5 shows an operation procedure between a UE and an eNB in a contention based random access procedure.

(1) First Message (Message 1) Transmission

First, a UE may randomly select a random access preamble within a group of random access preambles indicated through system information or a handover command, may select PRACH resources capable of transmitting the random access preamble, and then may transmit the selected random access preamble (Step 501).

(2) Second Message (Message 2) Reception

After transmitting the random access preamble in step S501, the UE may attempt to receive a response with respect to its random access preamble within a random access response reception window indicated through the system information or the handover command by the eNB (Step S502). More specifically, the random access response information is transmitted as a MAC PDU, and the MAC PDU may be transferred via the Physical Downlink Shared Channel (PDSCH). In addition, the Physical Downlink Control Channel (PDCCH) may be monitored such that the terminal appropriately receives information transferred via the PDSCH. That is, the PDCCH may include information about a UE that should receive the PDSCH, frequency and time information of radio resources of the PDSCH, a transfer format of the PDSCH, and the like. Here, if the PDCCH has been successfully received, the UE may appropriately receive the random access response transmitted via the PDSCH according to information of the PDCCH. The random access response may include a random access preamble identifier (ID) (e.g., Random Access Preamble Identifier (RAPID)), a UL Grant indicating uplink resources, a temporary C-RNTI, a Time Advance Command (TAC), and the like.

Here, the random access preamble identifier is included in the random access response in order to notify UEs to which information such as the UL Grant, the temporary C-RNTI, and the TAC would be valid because one random access response may include random access response information for one or more UEs. Here, it is assumed that the random access preamble identifier may be identical to the random access preamble selected by the UE in Step 502. Accordingly, the UE may receive the UL Grant, the temporary C-RNTI and the TAC.

(3) Third Message (Message 3) Transmission

If the UE has received the random access response valid to the UE itself, the UE may process each of the information included in the random access response. That is, the UE applies the TAC, and stores the temporary C-RNTI. In addition, data to be transmitted may be stored in a Message 3 buffer in correspondence with the reception of the valid random access response.

In addition, the UE uses the received UL Grant so as to transmit data (that is, Message 3) to the eNB (Step S503). Message 3 should be included in the identifier of the UE. This is because, in the contention based random access procedure, the eNB may not determine which UEs are performing the random access procedure, but later the UEs should be identified for contention resolution.

Here, two different schemes may be provided to include the UE identifier. A first scheme is to transmit the UE's cell identifier through an uplink transmission signal corresponding to the UL Grant if the UE has already received a valid cell identifier allocated in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a Contention Resolution (CR) timer.

(4) Fourth Message (Message 4) Reception

After transmitting the data with its identifier through the UL Grant included in the random access response, the UE waits for an indication (instruction) of the eNB for the contention resolution. That is, the UE attempts to receive the PDCCH so as to receive a specific message (Step 504). Here, there are two schemes to receive the PDCCH. As described above, if the UE identifier included in Message 3 transmitted in correspondence with the UL Grant is the cell identifier, the UE attempts to receive the PDCCH by using its own cell identifier. If the UE identifier included in Message 3 transmitted in correspondence with the UL Grant is its unique identifier, the UE attempts to receive the PDCCH by using the temporary C-RNTI included in the random access response. Thereafter, for the former, if the PDCCH is received through its cell identifier before the contention resolution timer expires, the UE determines that the random access procedure has been successfully (normally) performed, thus completing the random access procedure. For the latter, if the PDCCH is received through the temporary cell identifier before the contention resolution timer expires, the UE checks data transferred by the PDSCH that the PDCCH indicates. If the unique identifier of the UE is included in the data, the UE determines that the random access procedure has been successfully (normally) performed, thus completing the random access procedure.

Meanwhile, in the case where the UE receives the UL Grant signal through its temporary cell identifier even during the above-described random access procedure, the UE configures and transmits a UL signal according to the UL Grant signal. The transmission of the UL signal in a state in which the random access procedure of the UE collides with that of another UE may cause erroneous signal transmission, thus causing unnecessary power consumption and interference.

SUMMARY OF THE INVENTION

Accordingly, the present invention is directed to a random access method using a New Data Indicator (NDI) and a user equipment for the same that substantially obviate one or more problems due to limitations and disadvantages of the related art.

An object of the present invention is to provide a random access method of analyzing and solving a situation in which unnecessary uplink (UL) transmission is caused in the case where a User Equipment (UE) receives a UL grant signal through its temporary cell identifier during a random access procedure, and a user equipment for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of, at a user equipment, performing random access to a base station in a mobile communication system includes transmitting a random access preamble to the base station; receiving a random access response message including a first type identifier; transmitting an uplink (UL) message indicated by the first type identifier by a first Hybrid Automatic Repeat reQuest (HARQ) process according to the reception of the random access response message; setting a New Data Indicator (NDI) value corresponding to the first HARQ process to a first value; receiving a downlink (DL) message indicated by the first type identifier and including an NDI having a second value and a UL grant signal; and considering the random access as not successful if the first value and the second value of the NDIs are different from each other.

At this time, the mobile communication system may be a synchronous HARQ system, and the method may further include considering the random access as not successful if the UL grant signal of the DL message is received at a time point corresponding to a second HARQ process.

The receiving of the DL message may include receiving a Physical Downlink Control Channel (PDCCH) signal indicated by the first type identifier, and receiving the DL message through a Physical Downlink Shared Channel (PDSCH) transmitted through a resource area according to the PDCCH information.

The UL message may include a Medium Access Control (MAC) Packet Data Unit (PDU) including the second type identifier of the user equipment. The first type identifier may be a temporary cell identifier (Cell Radio Network Temporary Identifier (temporary C-RNTI)) and the second type identifier may be a cell identifier (C-RNTI).

If the first value and the second value of the NDIs are different from each other, the temporary cell identifier (temporary C-RNTI) indicated by the DL message may be a cell identifier (C-RNTI) of another user equipment other than the user equipment.

The user equipment may have the cell identifier (C-RNTI) before starting random access, and the user equipment may consider the random access as successful if the PDCCH signal indicated by the cell identifier is received after transmitting the UL message.

The method may further include discarding the first type identifier if the random access is considered as not successful.

The method may further include ignoring the UL grant signal if the random access is considered as not successful.

In another aspect of the present invention, a user equipment for performing random access to a base station in a mobile communication system includes a physical layer module including a transmission module for transmitting an uplink (UL) signal including a random access preamble to the base station and a reception module for receiving a downlink (DL) signal including a random access response message including a first type identifier; and a Medium Access Control (MAC) layer module configured to control a plurality of Hybrid Automatic Repeat reQuest (HARQ) processes and to control determination as to whether or not the random access is successful and whether or not the UL signal is transmitted, depending on whether or not a New Data Indicator (NDI) value stored in each of a plurality of HARQ buffers corresponding to the plurality of HARQ processes is toggled. If the physical layer module receives the random access response message including the first type identifier, the MAC layer module controls a UL message indicated by the first type identifier to be transmitted by a first HARQ process and sets the NDI value corresponding to the first HARQ process to a first value, and, if the physical layer module receives a DL message indicated by the first type identifier and including an NDI having a second value and a UL grant signal, the MAC layer module determines whether the first value and the second value of the NDIs are equal to each other, and considers the random access as not successful if the first value and the second value are different from each other.

The mobile communication system may be a synchronous HARQ system, and, if the UL grant signal of the DL message is received at a time point corresponding to a second HARQ process, the MAC layer module may consider the random access as not successful.

A Physical Downlink Control Channel (PDCCH) signal indicated by the first type identifier may be received and the DL message may be received through a Physical Downlink Shared Channel (PDSCH) transmitted through a resource area according to the PDCCH information.

The UL message may include a Medium Access Control (MAC) Packet Data Unit (PDU) including the second type identifier of the user equipment.

The first type identifier may be a temporary cell identifier (Cell Radio Network Temporary Identifier (temporary C-RNTI)) and the second type identifier may be a cell identifier (C-RNTI).

If the user equipment has the cell identifier (C-RNTI) before starting random access and the user equipment receives the PDCCH indicated by the cell identifier after transmitting the UL message, the user equipment may consider the random access as not successful.

The MAC layer module may be configured to discard the first type identifier if the random access is considered as not successful.

The MAC layer module may be configured to ignore the UL grant signal if the random access is considered as not successful.

According to the random access method and the user equipment for the same of the present invention, it is possible to prevent unnecessary uplink transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
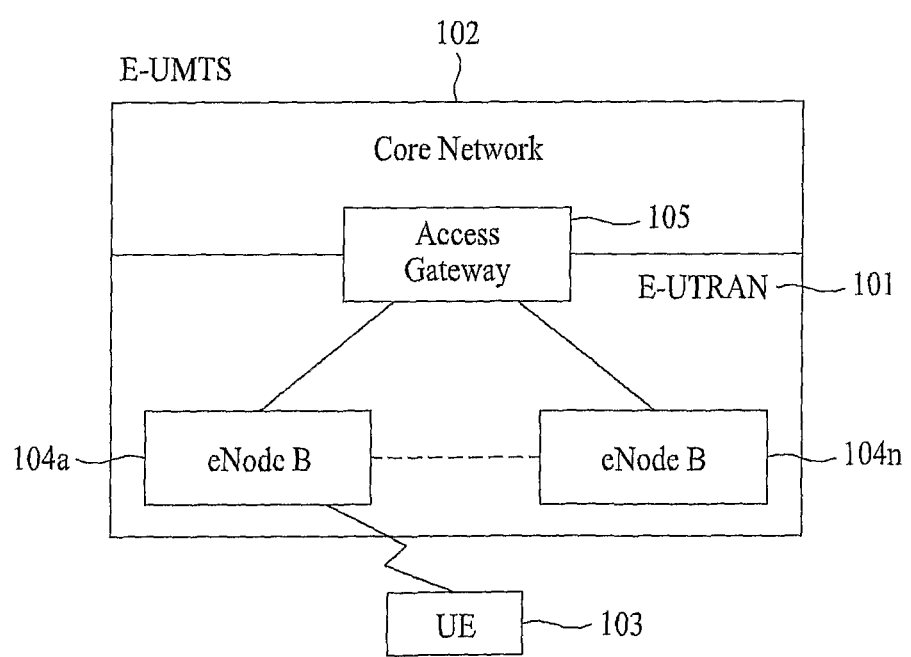
FIG. 1 is a schematic diagram of an Evolved Universal Mobile Telecommunications System (E-UMTS) network architecture as an example of a mobile communication system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For instance, although the following detailed description is made on the assumption that the mobile communication system is a 3GPP LTE system, it is applicable to other prescribed mobile communication systems by excluding unique items of the 3GPP LTE.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal is a generic term for a mobile or fixed user-end device such as a user equipment (UE), a mobile station (MS) and the like. In addition, it is assumed that a base station is a generic name for any node of a network end, which communicates with a terminal, such as a Node B, an eNode B and the like.

As described above, hereinafter, a situation in which unnecessary uplink (UL) transmission is caused in the case where a UE receives a UL grant signal through its temporary cell identifier during a random access procedure will be described in detail. First, a contention resolution method during the random access procedure will be described in detail.

Contention occurs in the random access procedure because the number of random access preambles is finite. That is, since an eNB cannot apply unique random access preambles to all the UEs, each of the UEs randomly selects one from among common random access preambles and transmits the selected random access preamble. Accordingly, two or more UEs may select and transmit the same random access preamble via the same Physical Random Access Channel (PRACH) resources. In this case, the eNB determines that the received random access preamble is transmitted from one UE.

To this end, the eNB transmits a random access response to the UE and expects that one UE receives the random access response. However, as described above, since contention may occur, two or more UEs receive one random access response and thus perform respective operations according to the reception of the random access response. That is, the two or more UEs transmit different data via the same radio resources using one UL grant included in the random access response.

Then, the transmission of the data by the two or more UEs may fail or the eNB may receive only the data of a specific UE according to the locations or the transmission powers of the UEs. In the latter case, since the two or more UEs determine that their data transmission is successfully performed, the eNB should notify the UEs, which fail contention, of information about the failure. That is, the notification of the information about failure or success of the contention is called contention resolution.

The contention resolution method includes two methods: one is a method of using a Contention Resolution (CR) timer and another is a method of transmitting an identifier of a UE, which successfully performs data transmission, to UEs.

The former method is used when the UE already has its unique cell identifier (C-RNTI) before the random access procedure. That is, the UE which already has the cell identifier transmits data including its cell identifier to the eNB according to the random access response and operates the CR timer. Then, when the UE receives Physical Downlink Control Channel (PDCCH) information included in its cell identifier before the CR timer expires, the UE determines that the UE itself succeeds in contention and normally completes the random access procedure. In contrast, if the UE does not receive the PDCCH including its cell identifier before the CR timer expires, the UE determines that the UE itself fails contention and performs the random access procedure again or notifies an upper layer of the failure.

The latter contention resolution method, that is, the method of transmitting the identifier of the UE which successfully performs data transmission, is used when the UE does not have a unique cell identifier before the random access procedure. That is, if the UE does not have its cell identifier, an identifier (e.g., S-TMSI or random ID) upper than the cell identifier is included in the data so as to be transmitted according to UL grant information included in the random access response, and the UE operates the CR timer. If the data including its upper identifier is transmitted via a DL-SCH before the CR timer expires, the UE determines that the random access procedure is successfully performed. In contrast, if the data including its upper identifier is not transmitted via the DL-SCH before the CR timer expires, the UE determines that the random access procedure fails.

The case where unnecessary UL transmission is caused in the case where the UE receives the UL grant signal through its temporary cell identifier will be described in detail with respect to FIG. 6.

Figure 6:
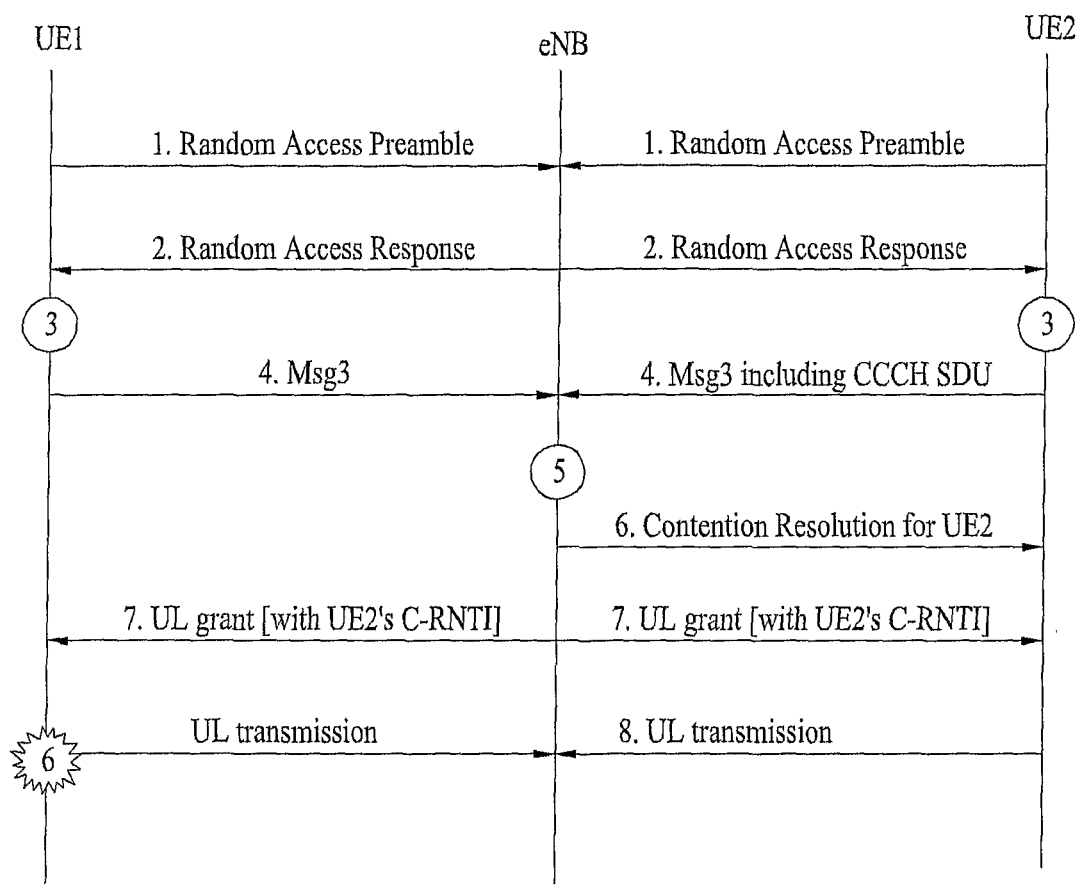
FIG. 6 is a diagram illustrating a situation in which unnecessary uplink (UL) transmission is caused in the case where a UE receives a UL grant signal through its temporary cell identifier.

FIG. 6 is a diagram illustrating a situation in which unnecessary UL transmission is caused in the case where a UE receives a UL Grant signal through its temporary cell identifier.

In the example shown in FIG. 6, it is assumed that two UEs 1 and 2 perform random access to one eNB. More particularly, it is assumed that, in step 1 of FIG. 6, the UEs 1 and 2 select and transmit the same PRACH resources and the same random access preamble to the eNB in the contention based random access procedure. That is, it is assumed that the random access preambles transmitted by the UEs 1 and 2 collide with each other. In step 2, the eNB considers that the random access preamble received from the UE is the random access preamble transmitted by one UE, and wirelessly transmits a random access response corresponding thereto. Since the eNB wirelessly transmits one random access response, the UEs 1 and 2 receive and process the same random access response message transmitted by the eNB (step 3). The random access response message includes UL scheduling information, a temporary cell identifier and the like, as described above.

Figure 4:
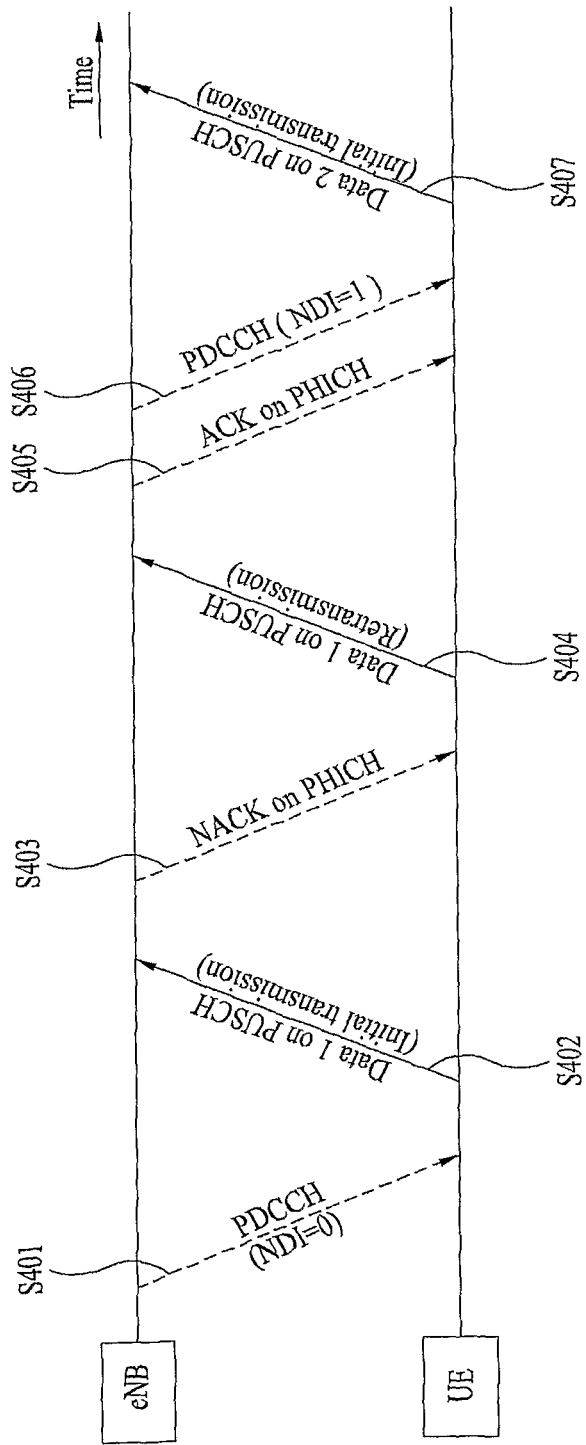
FIG. 4 is a diagram showing a HARQ operation performed in the LTE system.
Figure 5:
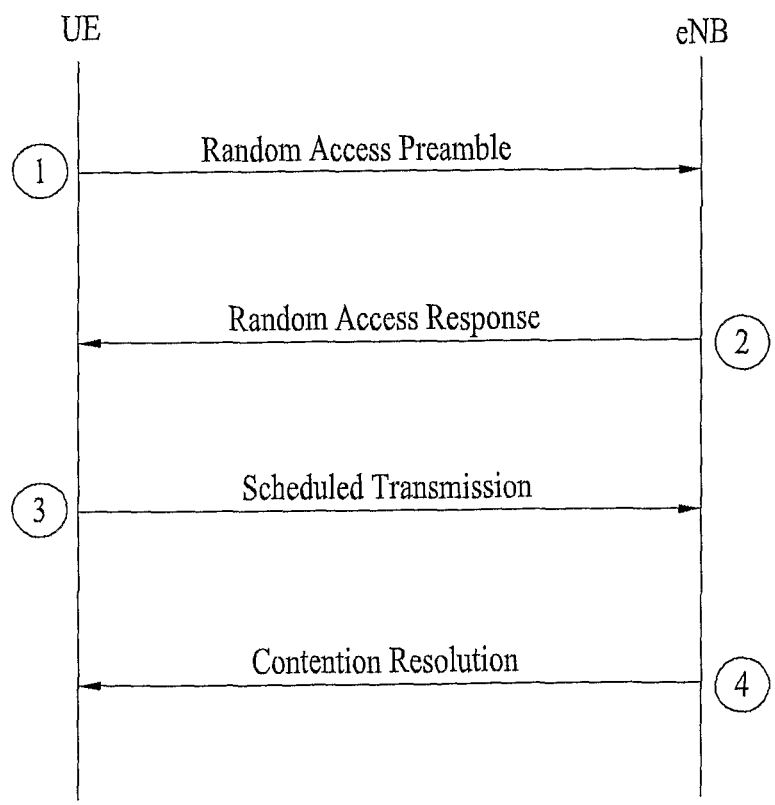
FIG. 5 is a diagram illustrating an operation procedure of a UE and an eNB in a contention based random access procedure.

Since collision occurs, in step 4 of FIG. 4, the UEs 1 and 2 may configure respective Medium Access Control (MAC) Protocol Data Units (PDUs) using the same UL scheduling information and transmit the respective MAC PDUs to the eNB through the same radio resources. In the embodiment of FIG. 6, it is assumed that the UE 1 has a cell identifier (Cell Radio Network Temporary Identifier (C-RNTI)) before the random access procedure is performed and the UE 2 does not have a cell identifier before the random access procedure is performed. It is assumed that the MAC PDU of a third message (Msg3) transmitted by the UE 1 includes C-RNTI information and the MAC PDU of a third message transmitted by the UE 2 includes a Common Control Channel (CCCH) Service Data Unit (SDU) including a unique identifier (e.g., a Temporary Mobile Subscriber Identity (S-TMSI) or a random ID) of the UE. Meanwhile, the UEs 1 and 2 set an NDI bit of a Hybrid Automatic Repeat reQuest (HARQ) process of transmitting the MAC PDUs to "0".

In the present embodiment, it is assumed that the eNB successfully receives only the MAC PDU transmitted by the UE 2 out of the MAC PDUs transmitted by the UEs 1 and 2. That is, in step 5, since the eNB receives the MAC PDU transmitted by the UE 2, the eNB prepares a contention resolution message for transmission to the UE 2. The contention resolution message includes the CCCH SDU received by the eNB.

In step 6 of FIG. 6, the UE 2 receives the contention resolution message transmitted by the base station. In this step, the UE 1 may receive the contention resolution message transmitted by the eNB over a wireless network. However, since the UE 1 having the cell identifier before the random access procedure is started does not attempt to receive a downlink (DL) assignment transmitted through a Physical Downlink Shared Channel (PDSCH) indicated by a temporary cell identifier after transmitting the third message, the eNB does not receive the contention resolution message transmitted by the UE 2. That is, the UE 1 does not receive DL information in addition to UL grant information received using the temporary cell identifier or a Physical Downlink Control Channel (PDCCH) received using its cell identifier.

In step 6, the UE 2 which receives the contention resolution message transmitted by the eNB determines that the random access procedure is successfully completed. Accordingly, the UE 2 sets the previously allocated temporary cell identifier as the cell identifier. In contrast, it is assumed that the UE 1 continues to attempt to receive the contention resolution message until a CR timer expires.

In step 7 of FIG. 6, the eNB may transmit UL grant information to the UE 2 using the cell identifier of the UE 2. Then, the UE 2 may transmit UL data to the eNB using the UL grant information (step 8).

However, before the CR timer of the UE 1 expires, the UE 1 may determine that the cell identifier of the UE 2 is the temporary cell identifier of the UE 1. Accordingly, if the UE 1 receives the UL scheduling information transmitted by the eNB using the cell identifier of the UE 2 (step 7), the UE 1 processes the UL scheduling information. Thus, a problem that the UE 1 transmits erroneous UL data to the eNB occurs (step 8).

In order to solve the above problem, in one embodiment of the present invention, determination as to whether the UL grant signal transmitted to the UE is transmitted to another UE is performed depending on whether or not an NDI is toggled during the random access procedure. In general, the NDI is used to determine whether data retransmission is performed or new data is transmitted in the HARQ operation as described above in association with FIG. 4. The conventional UE does not determine whether or not HARQ retransmission is performed depending whether or not the NDI is toggled in the random access procedure. In contrast, the UE according to the present embodiment determines whether or not the UL scheduling signal received during the random access procedure (more particularly, during the operation of the CR timer) is transmitted to another UE depending on whether or not the NDI is toggled, which will now be described with reference to FIG. 7.

Figure 7:
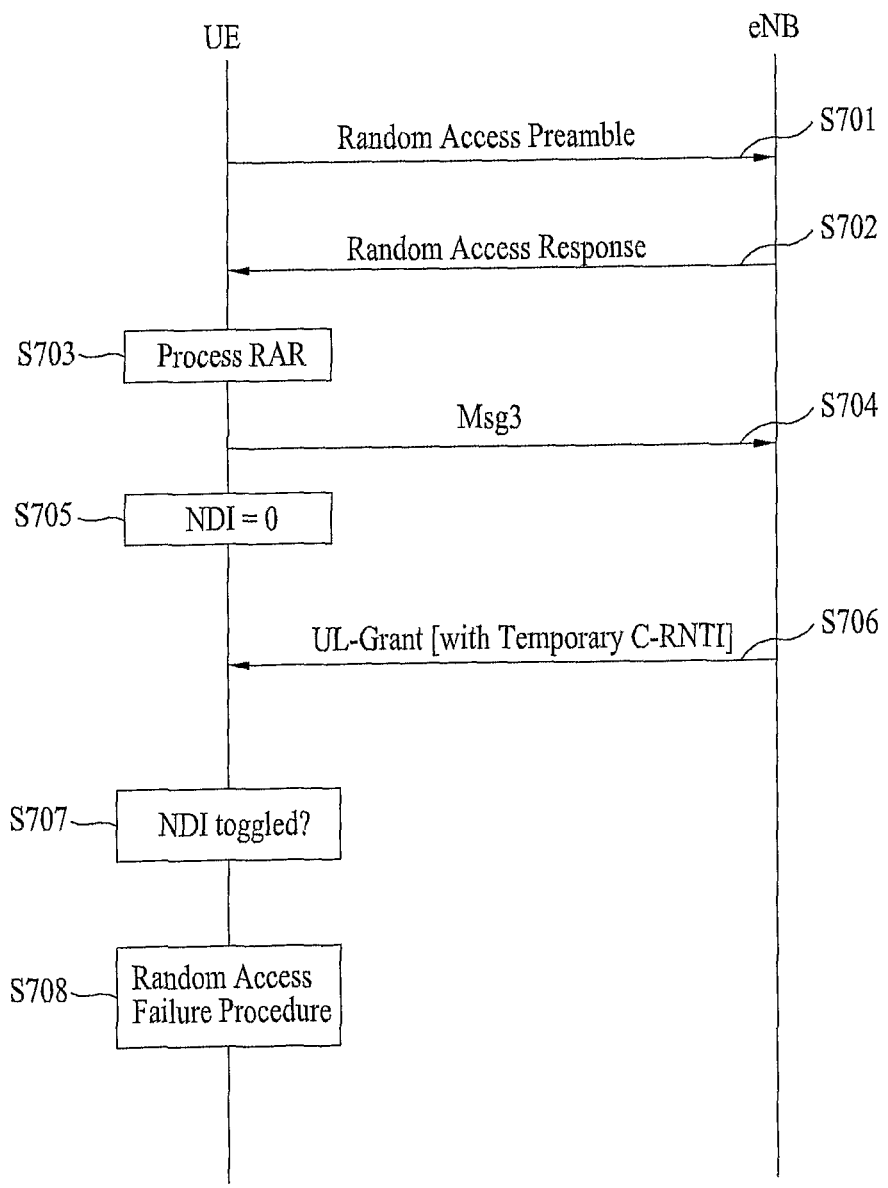
FIG. 7 is a diagram illustrating a method of, at a UE, performing random access to an eNB according to an embodiment of the present invention.

FIG. 7 is a diagram illustrating a method of, at a UE, performing random access to an eNB according to an embodiment of the present invention.

The UE may transmit a random access preamble to the eNB in order to perform a contention based random access procedure (S701). Then, the eNB may transmit a random access response to the UE (S702). The UE may process the random access response received from the eNB (S703). That is, the temporary cell identifier of the UE may be set to a temporary cell identifier value included in the received random access response and a MAC PDU may be generated according to UL grant information. At this time, the MAC PDU includes a cell identifier (C-RNTI) if the UE has the cell identifier before performing the random access procedure and includes a unique identifier (e.g., a S-TMSI) of the UE if the UE does not have the cell identifier. In addition, the UE according to the present embodiment sets the NDI value of a HARQ process associated with the transmission of the third message to 0. FIG. 7 shows the case where the UE sets the NDI value after transmitting the third message. However, if the HARQ process associated with the transmission of the third message is specified, the present invention is not limited to FIG. 7 and the NDI may be set before the third message is transmitted. Meanwhile, the UE which transmits the third message starts the CR timer.

UL grant information indicated by the temporary cell identifier of the UE may be received from the eNB during the operation of the CR timer of the UE (S706). When the UE which transmits the cell identifier through the third message during the random access procedure receives a PDCCH signal including its cell identifier from the eNB during the operation of the CR timer, the UE determines that contention resolution is successful. In addition, the conventional UE generates and transmits a UL signal when receiving the UL grant signal through its temporary cell identifier even during the random access procedure. In contrast, the UE according to the present embodiment determines whether or not the NDI bit value received together with the UL grant information is toggled (S707), without unconditionally transmitting the UL signal, when receiving the UL grant signal using the temporary cell identifier of the UE during the random access procedure, considers the random access procedure as not successful if the NDI bit value is toggled, and ignores the received UL grant signal. In the present embodiment, if the NDI of the DL signal received by the UE in step S706 is set to 1, the UE may perform a subsequent procedure according to random access procedure failure (S708). For example, the UE may attempt to perform random access to the eNB if the maximum allowable number of random access attempts is not reached, and notify an upper layer of random access failure if the maximum allowable number is reached. In addition, if the random access procedure is finished, the UE according to the present embodiment discards the temporary cell identifier used in the failed random access procedure. If the NDI of the DL signal received in step S706 is set to 0, the UE may generate and transmit a UL signal.

Figure 8:
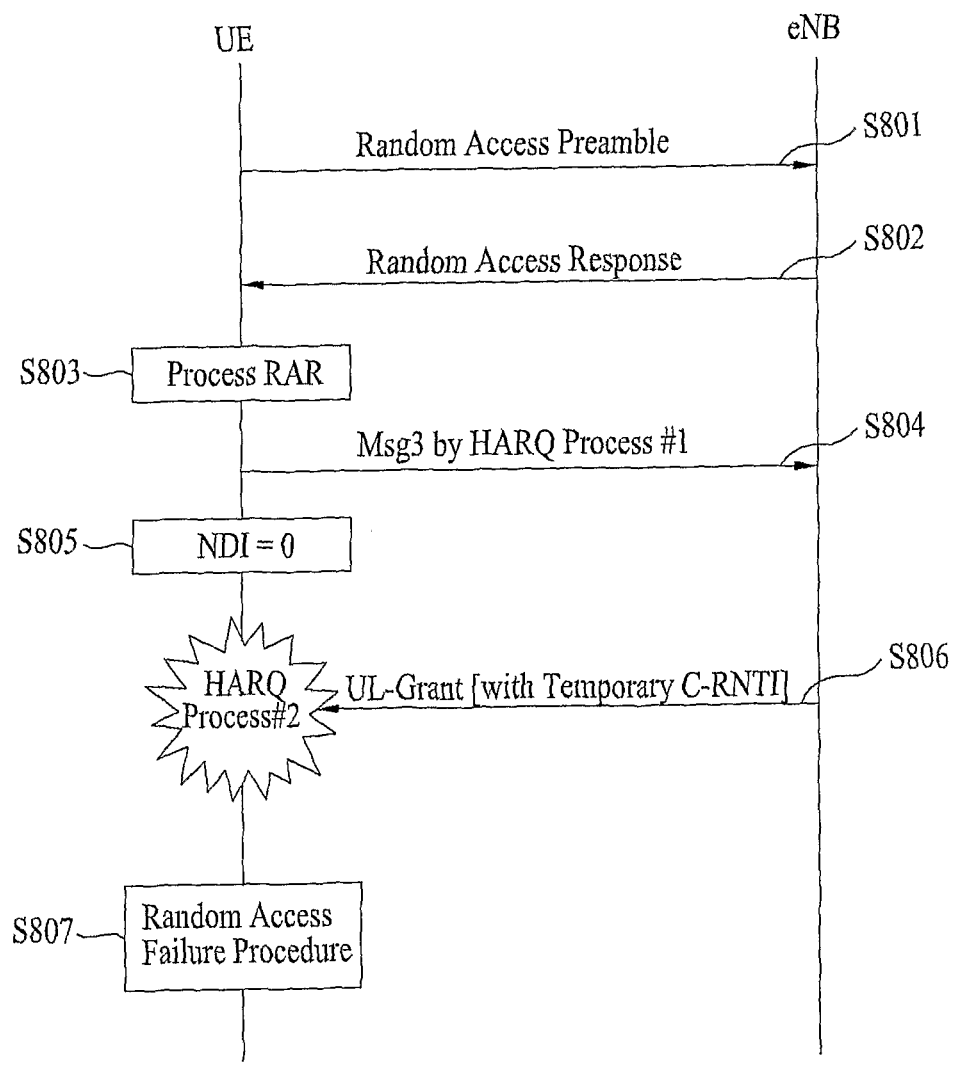
FIG. 8 is a diagram illustrating a method of, at a UE, performing random access to an eNB according to another embodiment of the present invention.

FIG. 8 is a diagram illustrating a method of, at a UE, performing random access to an eNB according to another embodiment of the present invention.

In FIG. 8, steps S801 to S805 are equal to steps of FIG. 7. In the example of FIG. 8, it is assumed that the UE transmits a third message by a HARQ process #1 (S804). The UE which transmits the third message starts a CR timer.

During the operation of the CR timer of the UE, that is, during the random access procedure, a UL grant signal may be received from the eNB using the temporary cell identifier of the UE. In the embodiment of FIG. 8, it is assumed that the UL grant signal is received at a time point corresponding to a HARQ process #2 of the UE. If the UL grant signal is received at a time point corresponding to a HARQ process other than the HARQ process associated with the transmission of the third message, the UE according to the present embodiment may consider the present random access procedure as not successful and perform a subsequent operation (S807). As described above in association with FIG. 4, in a 3GPP LTE system and a 3GPP LTE-A system, since a synchronous HARQ system is used to transmit the UL signal, the UL grant signal should be received by a HARQ process corresponding to the UL signal transmission. That is, the case where the UL grant signal is received at a time point corresponding to a HARQ process other than that of the transmission of the third message as in the example of FIG. 8 may correspond to the case where a signal transmitted to another UE is erroneously received. In the present embodiment, the temporary cell identifier may be discarded and a subsequent operation according to random access failure may be performed.

The embodiments described with reference to FIGS. 7 and 8 may be combined and used. For example, in the case where the UE receives the UL grant signal through its temporary cell identifier during the random access procedure as in step S707 of FIG. 7 and step S806 of FIG. 8 and the NDI is toggled or the UL grant signal is received at the time point corresponding to the HARQ process other than the HARQ process when transmitting the third message, the UE may consider the random access procedure as not successful and perform the operation corresponding thereto.

In addition, although the UE considers the random access procedure as not successful when receiving the UL grant signal transmitted to another UE in the above-described embodiments, the received UL grant signal may be ignored and reception of a fourth message may be continuously awaited during the operation of the CR timer.

Hereinafter, a UE for implementing the above-described embodiments will be described.

In a mobile communication system, the UE may include a signal input module, a display module, an antenna, a signal processor and the like. The configuration of the processor of the UE for performing the random access operation according to one embodiment of the present invention will be described in detail.

Figure 9:
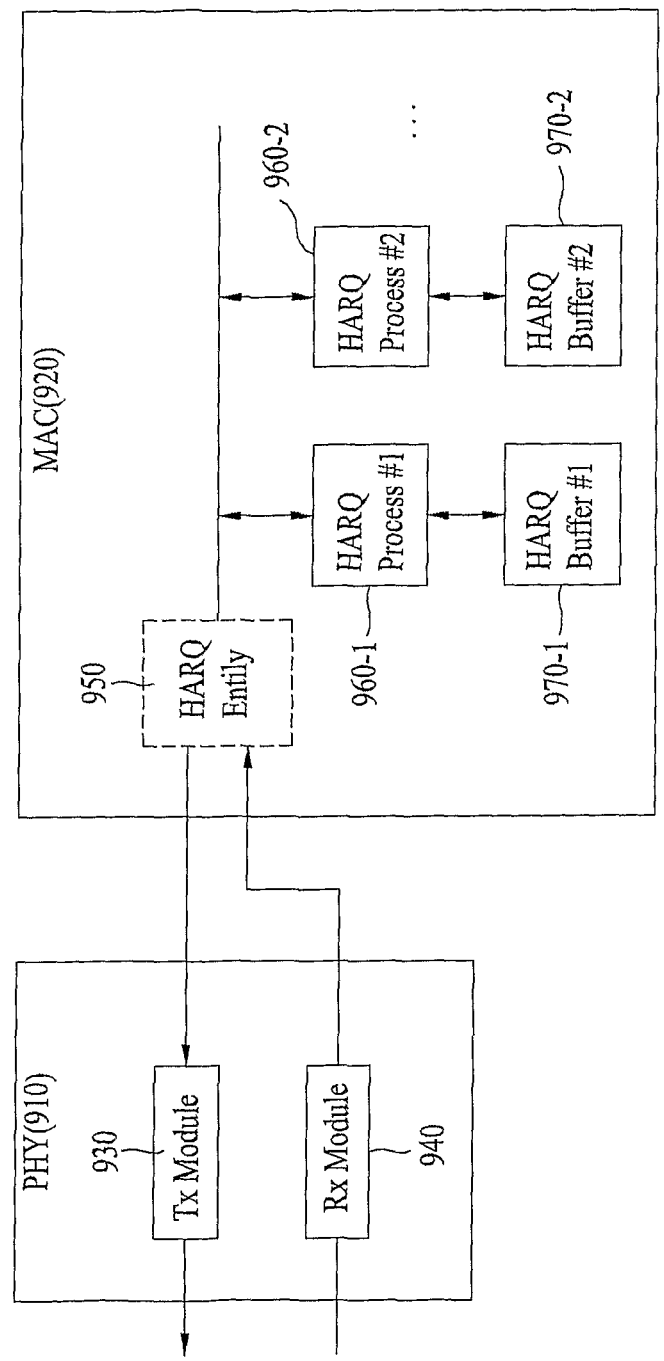
FIG. 9 is a diagram showing the configuration of a processor of a UE according to an embodiment of the present invention.

FIG. 9 is a diagram showing the configuration of a processor of a UE according to an embodiment of the present invention.

Figure 2:
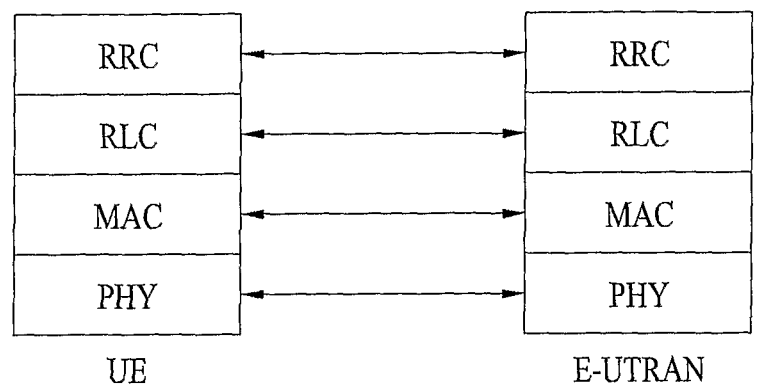
FIGS. 2 and 3 are diagrams showing the architectures of the radio interface protocol between a User Equipment (UE) and a UMTS Terrestrial Radio Access Network (UTRAN) based on the $3^{rd}$ Generation Partnership Project (3GPP) radio access network standard.
Figure 3:
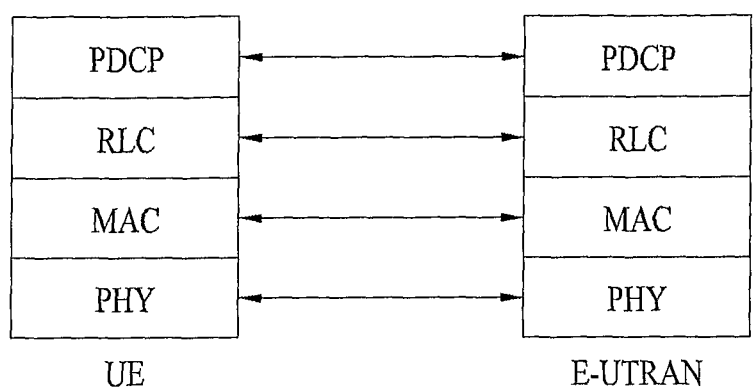

As shown in FIG. 9, the processor of the UE may have a layer architecture shown in FIGS. 2 and 3. Among the layers, the description is given concentrating on a physical (PHY) layer module 910 and a MAC layer module 920.

First, the PHY layer module 910 of the UE according to the present embodiment may include a transmission (Tx) module 930 for transmitting a UL signal such as a random access preamble to an eNB and a reception (Rx) module 940 for receiving a DL signal such as a random access response. The Rx module 940 of the PHY layer module 910 may receive a DL signal scrambled by a temporary cell identifier (temporary C-RNTI) or a UE's cell identifier (C-RNTI) while the UE performs the random access procedure. The Tx module 930 of the PHY layer module 910 may perform scrambling with respect to the third message using the temporary cell identifier and transmit the third message to the eNB.

Next, the MAC layer module 920 of the UE according to the present embodiment may include a plurality of HARQ processes 960 and HARQ buffers 970 respectively corresponding to the plurality of HARQ processes 960. The plurality of HARQ buffers 970 is logically divided and may physically form one storage space. In the 3GPP-series system, although the number of the HARQ processes and the HARQ buffers corresponding thereto is 8 and the HARQ processes are independently operated, the number is not limited.

The control of the plurality of HARQ processes 960 may be performed by a HARQ entity of the MAC layer module 920 and the present invention is not limited thereto.

The MAC layer module 920 of the UE according to the present embodiment is configured to determine whether or not random access is successful and/or whether the received UL grant signal is processed, depending on whether the NDI value corresponding to each of the plurality of HARQ processes 960 is toggled. If the UL grant signal is received through a DL control channel, in which the NDI is set to 1, during the random access procedure, the UE may be configured to ignore the UL grant signal without transmitting a UL signal according to the UL grant signal. More particularly, as described above, if the UL grant signal in which the NDI value is toggled is received during the random access procedure, the MAC layer module 920 may be configured to consider the random access procedure as not successful. Thus, the UE may perform a subsequent operation according to random access failure.

The MAC layer module 920 may ignore the UL grant signal and continuously await reception of a fourth message during the operation of a CR timer, when the UL grant signal in which the NDI value is toggled is received during the random access procedure as described above.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of a user equipment (UE) communicating with a base station (BS) in a mobile communication system, the method comprising:
   transmitting uplink (UL) data according to a first Hybrid Automatic Repeat reQuest (HARQ) process;
   setting a New Data Indicator (NDI) value corresponding to the first HARQ process to a first value; and
   receiving a downlink (DL) message including an NDI having a second value, the NDI having the second value used by the UE to determine whether to retransmit the UL data in a first state in which a random access procedure is not performed and to determine whether to retransmit a random access preamble in a second state in which the random access procedure is performed,
   wherein the UE in the first state determines to not retransmit the UL data when the first value is different from the second value and determines to retransmit the UL data when the first value is the same as the second value, and wherein the UE in the second state determines to retransmit the random access preamble when the first value is different from the second value and determines to not retransmit the random access preamble when the first value is the same as the second value.

2. The method of claim 1, wherein:
the mobile communication system is a synchronous HARQ system;
the DL message further includes an UL grant signal; and
the UE in the second state considers the random access as not successful if the UL grant signal is received at a time point corresponding to a second HARQ process.

3. The method of claim 1, wherein receiving the DL message comprises:
receiving a Physical Downlink Control Channel (PDCCH) signal indicated by a first type identifier; and
receiving the DL message via a Physical Downlink Shared Channel (PDSCH) transmitted through a resource area according to PDCCH information of the PDCCH signal.

4. The method of claim 3, wherein the UL data includes a Medium Access Control (MAC) Packet Data Unit (PDU) including a second type identifier.

5. The method of claim 4, wherein the first type identifier is a temporary Cell Radio Network Temporary Identifier (C-RNTI) and the second type identifier is a C-RNTI.

6. The method of claim 5, wherein the temporary C-RNTI is a C-RNTI of a UE other than the UE that performs the random access if the first value is different from the second value.

7. The method of claim 5, wherein:
the UE has the C-RNTI before starting the random access; and
the random access is determined as successful if the PDCCH signal is received after transmitting the UL data.

8. The method of claim 3, further comprising:
discarding the first type identifier if the random access is determined as not successful.

9. The method of claim 2, further comprising:
ignoring the UL grant signal if the random access is determined as not successful.

10. A user equipment (UE) communicating with a base station (BS) in a mobile communication system, the UE comprising:
a physical layer module including a transmission module for transmitting uplink (UL) data to the BS and a reception module for receiving a downlink (DL) message including a New Data Indicator (NDI) from the BS; and
a Medium Access Control (MAC) layer module for:
controlling a plurality of Hybrid Automatic Repeat reQuest (HARQ) processes; and
determining whether to retransmit the UL data or a random access preamble based on the NDI value,
wherein the MAC layer module determines to retransmit the UL data when the UE is not performing a random access procedure and the NDI value is not toggled and when the UE is not performing the random access procedure and the NDI value is, and
wherein the MAC layer module determines not to retransmit the random access preamble when the UE is performing the random access procedure and the NDI value is not toggled and when the UE is performing the random access procedure and the NDI value is toggled.

11. The user equipment of claim 10, wherein:
the mobile communication system is a synchronous HARQ system;
the DL message further includes an UL grant signal; and
the MAC layer module determines the random access as not successful if the UL grant signal is received at a time point corresponding to a second HARQ process.

12. The user equipment of claim 10, wherein receiving the DL message comprises:
receiving a Physical Downlink Control Channel (PDCCH) signal indicated by a first type identifier; and
receiving the DL message via a Physical Downlink Shared Channel (PDSCH) transmitted through a resource area according to PDCCH information of the PDCCH signal.

13. The user equipment of claim 12, wherein the UL data includes a MAC Packet Data Unit (PDU) including a second type identifier.

14. The user equipment of claim 13, wherein the first type identifier is a temporary Cell Radio Network Temporary Identifier (C-RNTI) and the second type identifier is a C-RNTI.

15. The user equipment of claim 14, wherein:
the UE has the C-RNTI before starting the random access; and
the random access is determined as successful if the PDCCH signal is received after transmitting the UL data.

16. The user equipment of claim 12, wherein the MAC layer module is further for discarding the first type identifier if the random access is determined as not successful.

17. The user equipment of claim 11, wherein the MAC layer module is further for ignoring the UL grant signal if the random access is determined as not successful.

18. The user equipment of claim 14, wherein the temporary C-RNTI is a C-RNTI of a UE other than a UE that performs the random access if the NDI value is toggled.

* * * * *